United States Patent [19]

Sager

[11] Patent Number: 5,196,079
[45] Date of Patent: Mar. 23, 1993

[54] METHOD AND APPARATUS FOR JOINING THERMOPLASTIC WORKPIECES BY HIGH FREQUENCY VIBRATIONS

[75] Inventor: Thomas B. Sager, Newtown, Conn.

[73] Assignee: Branson Ultrasonics Corporation, Danbury, Conn.

[21] Appl. No.: 643,125

[22] Filed: Jan. 18, 1991

[51] Int. Cl.$^5$ ............................................. B32B 31/16
[52] U.S. Cl. ................................... 156/73.1; 156/158;
156/304.1; 156/580.1; 156/580.2; 264/23;
425/174.2
[58] Field of Search .................... 156/73.1, 73.5, 580.1,
156/580.2, 158, 304.1, 304.2, 304.3, 304.5,
304.6, 252, 503, 73.3, 253; 264/23; 425/174.2;
228/1.1, 110

[56] References Cited

U.S. PATENT DOCUMENTS

| | | | |
|---|---|---|---|
| 3,758,355 | 9/1973 | Witherow | 156/252 X |
| 3,790,059 | 2/1974 | Jacke et al. | 156/580.1 X |
| 4,070,217 | 1/1978 | Smith, II et al. | 156/73.2 |

FOREIGN PATENT DOCUMENTS 1225628  3/1971  United Kingdom .................. 285/21

*Primary Examiner*—David A. Simmons
*Assistant Examiner*—J. Sells
*Attorney, Agent, or Firm*—Polster, Lieder, Woodruff & Lucchesi

[57] ABSTRACT

A method and apparatus are disclosed for joining a plurality of tubular thermoplastic workpieces by causing the workpieces to be stacked with their internal surfaces axially aligned. High frequency vibrations are applied to the respective inner surfaces of the stacked workpieces, the motion of the vibrations being predominantly along the axial alignment of the workpieces. Responsive to the dissipation of the vibratory energy, thermoplastic material from the inner surfaces of the workpieces becomes molten and flows and, upon the cessation of the vibrations, the molten and flowed material rigidifies to cause the workpieces to be joined. The high frequency vibrations, most suitably, are provided by a horn adapted to be resonant as a half wavelength resonator at an ultrasonic frequency in the range between 16 and 25 kHz.

16 Claims, 1 Drawing Sheet

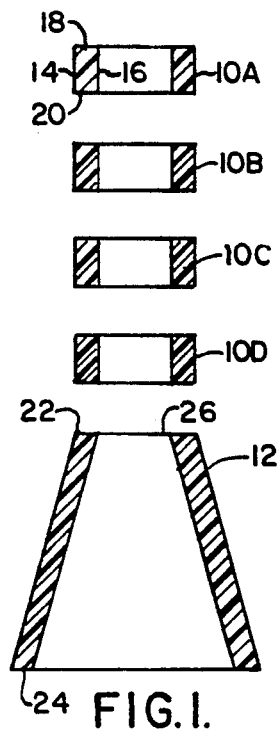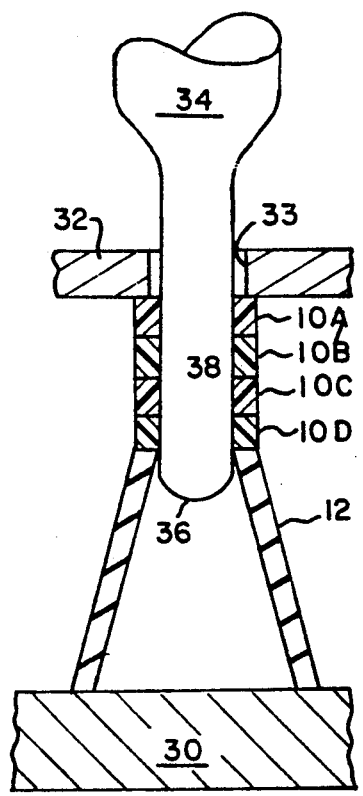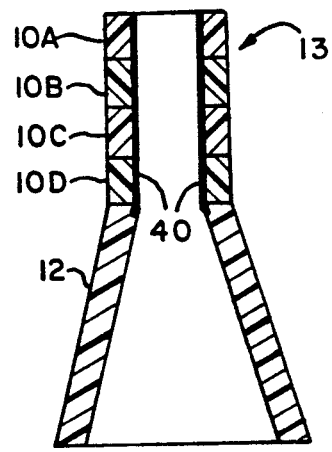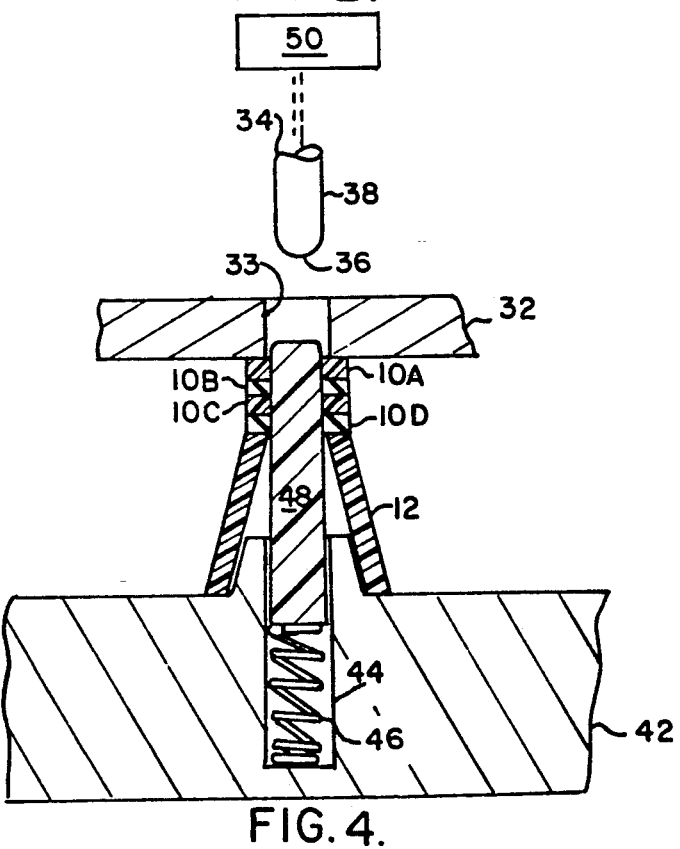

METHOD AND APPARATUS FOR JOINING THERMOPLASTIC WORKPIECES BY HIGH FREQUENCY VIBRATIONS

BRIEF SUMMARY OF THE INVENTION

This invention concerns a method and apparatus for joining a plurality of thermoplastic workpieces and, more specifically, relates to a method and apparatus for joining a plurality of tubular thermoplastic workpieces by applying high frequency vibrations, preferably vibrations in the ultrasonic frequency range, to the respective inner surfaces of the workpieces for causing thermoplastic material from such inner surfaces to soften and flow responsive to the dissipation of the vibratory energy and, upon the cessation of such vibratory energy, the softened and flowed material to rigidify, causing the workpieces to be joined to one another. In a preferred embodiment, the vibratory energy is provided by a horn adapted to be rendered resonant which enters the inside of the stacked thermoplastic workpieces, the horn being dimensioned for having a snug sliding fit between a portion of the horn's side surface disposed substantially at the antinodal region of the horn and the respective inner surfaces of the workpieces for causing the vibrations from the horn to be coupled in the shear mode to the inner surfaces of the workpieces.

Using high frequency vibrations, particularly vibrations in the ultrasonic frequency range, is well known in the art. Generally, two thermoplastic workpieces to be joined are in forced contact superposed upon one another and ultrasonic vibrations are coupled to one of the workpieces, the vibratory energy being transmitted in compressional wave form from said one workpiece to the common interface between both workpieces where the dissipation of vibratory energy effects a joint. Not all thermoplastic workpieces lend themselves to this latter arrangement. For instance, workpieces made from butyrate material can not be welded in this manner, since the stated material fails to effectively transmit vibratory energy and, moreover, the stated material yields under an applied force. While workpieces made from butyrate or similar thermoplastic material can be joined by solvents, the use of solvents has become undesirable because of solvent fumes and the consequent contamination of the air, and because in many instances the cosmetic appearance of the workpieces is impaired as a result of running or oozing of solvent material. Also, many solvents present a health and fire hazard.

The present invention relates to the joining of a plurality of tubular thermoplastic workpieces which are stacked upon one another in a manner causing the inner surfaces of the workpieces to be axially aligned, and then applying high frequency vibrations to the respective inner surfaces for causing thermoplastic material from the surface of the respective inner surfaces to soften and flow and when caused to rigidify, responsive to the cessation of the vibrations, to effect a joint between the workpieces. This process is extremely fast, clean and economical.

One of the principal objects of this invention, therefore, is the provision of a new and improved method and apparatus for joining a plurality of thermoplastic workpieces.

Another important object of this invention is the provision of a novel method and apparatus for joining a plurality of tubular thermoplastic workpieces by applying high frequency vibrations to the respective inner surfaces of the workpieces where the inner surfaces of the workpieces are axially aligned.

Another important object of this invention is the provision of a method and apparatus for joining a plurality of tubular thermoplastic workpieces by applying high frequency vibrations in the ultrasonic frequency range to the respective inner surfaces of the workpieces, the vibrations being supplied by a horn rendered resonant contacting the inner surfaces.

A further object of this invention is the provision of a method and apparatus for joining a plurality of workpieces which are made from a thermoplastic material which yields under pressure and, therefore, is difficult to join using conventional ultrasonic vibrations which are transmitted through one workpiece to the interface with the other workpiece.

Further and still other objects of this invention will be more clearly apparent from the following description when read in conjunction with the accompanying drawings.

BRIEF DESCRIPTION OF THE DRAWINGS

FIG. 1 is an exploded view of the thermoplastic workpieces to be joined;

FIG. 2 is an elevational view, partly in section, showing the joining method disclosed herein;

FIG. 3 is an elevational view, in section, showing the workpieces in joined condition, and FIG. 4 is an elevational view, partly in section, showing an embodiment of an apparatus for joining the workpieces in accordance with the method described herein.

DETAILED DESCRIPTION OF THE INVENTION

Referring to the figures and FIG. 1 in particular, there are shown four tubular, substantially identical workpieces 10A, 10B, 10C and 10D, and a truncated cone shaped workpiece 12 which are to be joined. Each tubular workpiece has an outer cylindrical surface 14, an inner cylindrical surface 16 and a set of radially disposed surfaces 18 and 20. The respective inner surfaces 16 of the workpieces 10A, 10B, 10C and 10D are of the same dimension while the respective outer surface 14 could be of any suitable dimension and shape. The workpiece 12 has an upper radial surface 22 and a lower radial surface 24. The inner surface portion 26 disposed at the upper radial surface 22 is of substantially the same dimension as the respective inner surfaces 16 of the workpieces 10A, 10B, 10C and 10D.

The workpieces noted above are made, for instance, from butyrate thermoplastic or similar material which is a poor transmitter for high frequency vibrations and which tends to yield under the application of an intense force.

FIG. 2 shows the method of joining the plurality of workpieces. The workpieces 10A, 10B, 10C, 10D and 12 are stacked upon one another in a manner to cause axial alignment of the respective inner surfaces 16 and 26, and are supported upon a base support plate 30. The axial alignment provides an axially extending opening delimited by the inner surfaces 16 and 26 of the workpieces. A stripper plate 32 provides a moderate engagement force between the workpieces along their radially disposed surfaces. A cylindrically shaped horn 34 adapted to be resonant as a half wavelength resonator along its longitudinal axis at a predetermined high frequency, preferably at a frequency in the ultrasonic frequency range between 16 and 25 kHz, is inserted in the cylindrical opening formed by the stacked workpieces. The horn 34, when rendered resonant along its axis, will exhibit an antinode of longitudinal vibrations at its free end surface 36 and the cylindrical side surface portion 38 of the horn disposed just rearward of the end surface 36 will also be located substantially at the antinodal region of the horn where the motion of the high frequency vibrations of the horn is predominantly along the axial direction. The surface portion 38 of the horn is dimensioned to have a snug sliding fit with inner surfaces 16 and the surface portion 26. The stripper plate 32 has an aperture 33 which provides ample clearance for the motion of the horn 34.

When the horn 34 is rendered resonant responsive to energization by an electrical high frequency power supply and electroacoustic converter, not shown, the surface portion 38 of the horn will undergo vibrations along the longitudinal axis at the predetermined high frequency, such vibrations being applied and coupled to the respective inner surfaces of the workpieces with which the horn portion is in contact. Responsive to the dissipation of vibratory energy, thermoplastic material from the inner surfaces of the workpieces softens and flows along the inner workpiece surfaces and across the interface between two abutting workpieces, and when the horn subsequently is rendered non-vibratory, the softened and flowed thermoplastic material rigidifies to effect a joint between the workpieces, specifically across the inside areas where respective abutting workpieces are in contact with one another. As will be noted, the vibrations are applied to the workpieces substantially in the shear mode, that is, parallel to the workpiece surfaces in the axial direction.

Subsequently, the horn 34 can be raised and the stripper plate, if held stationary, strips the assembled workpieces from the horn to provide an assembly 13 as shown in FIG. 3. The molten and subsequently rigidified thermoplastic material is indicated by the heavy lines 40.

In a typical example, the workpieces 10A, 10B, 10C and 10D had an inside diameter of about ⅜ inch, a height of ⅛ inch and an outside diameter of 7/16 inch. The horn was a high gain aluminum horn, resonant at 20 kHz, and providing along surface portion 38 vibrations having an approximate peak-to-peak amplitude of 0.0035 inch. The horn was rendered resonant for a time interval of 35 milliseconds. It shall be understood that the above values are provided for illustrative purposes only and no limitation shall be implied as obviously workpieces having other dimensions or configurations can be joined in a like manner. For instance, the inner surfaces do not need to be circular, but can be of square or rectangular cross-section. The horn then would be of square or rectangular shape for providing contact between the respective horn side surfaces and the inner surfaces of the workpieces. It will be appreciated by those skilled in the art that the amplitude of the vibrations provided by the horn is frequency dependent, i.e. the amplitude decreases as the frequency of the vibrations increases. It will be apparent, however, that the heretofore stated method differs from the more conventional ultrasonic welding method which employs ultrasonic waves in the compression mode for achieving a joint between thermoplastic workpieces.

FIG. 4 depicts a typical apparatus for carrying out the above described method. A base plate 42 is provided with a recess 44 for supporting a spring loaded plunger 48 engaged at its lower end by a helical compression spring 46. The plunger 48 can be made from nylon, Teflon or similar plastic material. The outside diameter of the plunger 48 is dimensioned for receiving the workpieces and retaining them in stacked alignment. Then, the stripper plate 32 is set upon the uppermost workpiece 10A to provide forced engagement between the workpieces. The stripper plate may be put in place manually or by motive means, not shown. Subsequently, the horn 38 is lowered by motive means 50 as is well known in commercially available welding apparatus, see for instance U.S. Pat. No. 3,790,059 dated Feb. 5, 1974, issued to S. E. Jacke et al, entitled "Ultrasonic Apparatus". Lowering of the horn causes the horn to enter the axially extending opening formed by the stacked workpiece assembly, causing the plunger 48 to be driven downward against the pressure exerted by the spring 46. The horn is stopped in the position as illustrated in FIG. 2 and energized to be resonant for a brief period of time, see supra. Subsequently, the horn 38 is raised, the stripper plate 32 removed and the finished workpiece assembly lifted from the plunger 48.

It will be apparent that the above described apparatus is just one of many embodiments and that other and similar apparatus may be devised for aligning and holding a plurality of workpieces in place for providing a joint or weld in accordance with the teachings of the present invention.

For the construction and dimensioning of horns, causing them to be resonant at a predetermined frequency, reference is made to "Ultrasonic Engineering" (book) by Julian R. Frederick, John Wiley & Sons, New York, N.Y. (1965), pages 87–103.

While there has been described and illustrated a preferred method and apparatus of the invention, it will be apparent to those skilled in the art that various changes and modifications may be made without deviating from the broad principle of this invention which shall be limited only by the scope of the appended claims.

What is claimed is:

1. The method of joining a plurality of tubular thermoplastic workpieces comprising:

stacking the tubular workpieces upon one another in a manner causing the respective inner surfaces of said workpieces to be axially aligned to cause an axially extending opening delimited by said inner surfaces;

causing said workpieces to be in forced abutting contact with one another along their respective radially disposed surfaces;

applying during a time interval high frequency vibrations to the respective inner surfaces for causing, responsive to the dissipation of energy provided by said vibrations, thermoplastic material to soften and flow along said respective inner surfaces and across the interface between two abutting stacked workpieces at said opening, and terminating said time interval for causing said vibrations to cease, whereby said softened and flowed thermoplastic material along said inner surfaces and respective interface between two abutting workpieces rigidifies to cause abutting workpieces to be joined to one another.

2. The method of joining a plurality of tubular thermoplastic workpieces as set forth in claim 1, said vibrations having a frequency in the ultrasonic frequency range.

3. The method of joining a plurality of tubular thermoplastic workpieces as set forth in claim 1, said vibrations having a frequency in the ultrasonic frequency range and an axis of vibration substantially parallel to the axis along which the workpieces are aligned.

4. The method of joining a plurality of tubular thermoplastic workpieces as set forth in claim 1, said vibrations being applied to said inner surfaces by a side surface portion of a horn dimensioned to be resonant along its longitudinal axis as a half wavelength resonator at a predetermined frequency in the ultrasonic frequency range.

5. The method of joining a plurality of tubular thermoplastic workpieces as set forth in claim 4, said side surface portion of said horn being disposed substantially at an antinodal region of axial vibrations of said horn, causing said vibrations to be applied in the shear mode.

6. The method of joining a plurality of thermoplastic workpieces as set forth in claim 5, said horn being resonant at a predetermined frequency in the range between 16 kHz and 25 kHz.

7. The method of joining a plurality of thermoplastic workpieces as set forth in claim 4, the inner surfaces of said workpieces being round, said surface portion of said horn being of cylindrical shape and dimensioned to have a snug sliding fit with said inner surfaces.

8. The method of joining a plurality of thermoplastic workpieces as set forth in claim 7, said workpieces being made from butyrate material.

9. An apparatus for joining a plurality of thermoplastic workpieces comprising:
    means for supporting the plurality of tubular workpieces in stacked relationship with the respective inner surfaces of the workpieces in axial alignment to cause an axially extending opening delimited by said inner surfaces;
    means for causing said stacked workpieces to be in forced abutting engagement with one another along their respective radially disposed surfaces, and
    a horn dimensioned to be resonant as a half wavelength resonator at a predetermined high frequency disposed in said axially extending opening for engaging the respective inner surfaces of the workpieces in a manner causing a portion of the side surface of said horn to be in vibration transmitting engagement with the respective inner surfaces of the workpieces for causing, responsive to said horn being rendered resonant for a brief time interval, vibrations substantially along the longitudinal axis of the stacked workpieces to be applied to said inner surfaces, whereby, responsive to the dissipation of vibratory energy, thermoplastic material from the inner surfaces of the workpieces is caused to soften and to flow along said respective inner surfaces and across the interface between two abutting stacked workpieces at said opening and said softened and flowed material upon the cessation of said vibrations rigidifies to cause abutting workpieces to be joined to one another.

10. An apparatus for joining a plurality of tubular thermoplastic workpieces as set forth in claim 9, said horn being dimensioned to be resonant at a predetermined frequency in the ultrasonic frequency range.

11. An apparatus for joining of plurality of tubular thermoplastic workpieces as set forth in claim 10, said predetermined frequency being in the range between 16 kHz and 25 kHz.

12. An apparatus for joining a plurality of tubular thermoplastic workpieces as set forth in claim 9, said means for supporting said workpieces and causing them to be in stacked relationship and axial alignment including a base plate and an axially movable plunger supported by said plate.

13. An apparatus for joining a plurality of tubular thermoplastic workpieces as set forth in claim 12, said plunger being dimensioned for engaging the respective inside surfaces of the workpieces, and being axially displaced by said horn when the horn is brought into engagement with the inner surfaces of the workpieces.

14. An apparatus for joining a plurality of tubular thermoplastic workpieces as set forth in claim 13, said plunger being resiliently mounted for axial displacement.

15. An apparatus for joining a plurality of tubular thermoplastic workpieces as set forth in claim 9, said means for causing said workpieces to be in forced engagement comprising a stripper plate for engaging the topmost workpiece of the stacked workpieces, said stripper plate having an aperture through which said horn is adapted to move.

16. An apparatus for joining a plurality of tubular thermoplastic workpieces as set forth in claim 9, said portion of said side surface of said horn being dimensioned to have a snug sliding fit with the respective inner surfaces of the workpieces, and said portion of said side surface being disposed substantially at an antinodal region of axial vibrations.

* * * * *